United States Patent
Hallbjorner

(10) Patent No.: US 6,798,321 B2
(45) Date of Patent: Sep. 28, 2004

(54) MICRO ELECTROMECHANICAL SWITCHES

(75) Inventor: Paul Hallbjorner, Göteborg (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 31 days.

(21) Appl. No.: 10/112,035

(22) Filed: Apr. 1, 2002

(65) Prior Publication Data

US 2003/0006125 A1 Jan. 9, 2003

(30) Foreign Application Priority Data

Apr. 2, 2001 (SE) .............................. 0101183

(51) Int. Cl.$^7$ .............................. H01H 51/22
(52) U.S. Cl. .................. 335/78; 200/181; 361/233
(58) Field of Search .................. 335/78; 200/181; 257/415–418; 361/233

(56) References Cited

U.S. PATENT DOCUMENTS

| | | | | |
|---|---|---|---|---|
| 5,258,591 A | * | 11/1993 | Buck | 200/181 |
| 5,367,136 A | * | 11/1994 | Buck | 200/600 |
| 5,578,976 A | * | 11/1996 | Yao | 333/262 |
| 5,994,796 A | | 11/1999 | De Los Santos | |
| 6,000,280 A | * | 12/1999 | Miller et al. | 73/105 |
| 6,377,438 B1 | * | 4/2002 | Deane et al. | 361/278 |
| 6,404,304 B1 | * | 6/2002 | Kwon et al. | 333/202 |

FOREIGN PATENT DOCUMENTS

| | | |
|---|---|---|
| EP | 0986077 A2 | 3/2000 |
| WO | 00/5722 A1 | 9/2000 |
| WO | 00/75999 A1 | 12/2000 |

OTHER PUBLICATIONS

U.S. patent application Ser. No. 10/112,046 filed Apr. 1, 2002, Paul Hallbjorner et al.
U.S. patent application Ser. No. 10/112,051 filed Apr. 1, 2002, Paul Hallbjorner.
IEEE Journal of Microelectromechanical Systems, Jun. 1999, vol. 8, No. 2, pp. 129 134, 1555 1057 1015, Z. James Yao et al., "Micromachined Low–Loss Microwave Switches".
IEEE Transactions on Microwave Theory and Techniques, Nov. 1998, vol. 46, No. 11, pp. 1868 18888, 155N and 9480, Elliot R. Brown, "RF–MEMS Switches for Reconfigurable Integrated Circutis".

* cited by examiner

Primary Examiner—Lincoln Donovan
(74) Attorney, Agent, or Firm—Nixon & Vanderhye P.C.

(57) ABSTRACT

A micro electromechanical switch structure includes a beam that is continuously controllable by adding an actuation electrode proximate to, but outside a beam projection. The beam projection is onto and perpendicular to a plane of the actuation electrode. By placing an actuation electrode beside a beam instead of underneath the beam, the actuation electrode can continuously control the movement of the beam from a rest position to a complete actuation.

14 Claims, 4 Drawing Sheets

MICRO ELECTROMECHANICAL SWITCHES

TECHNICAL FIELD

The invention concerns micro electromechanical switches and more particularly micro electromechanical switch structures.

BACKGROUND

Micro electromechanical switches are used in a variety of applications up to the microwave frequency range. A micro electromechanical switch is usually a beam with support at one or both ends. The support will normally either extend above a substrate surface or be level with the substrate surface, i.e. a micro electromechanical switch is normally built on top of the substrate surface or into the substrate. The beam acts as one plate of a parallel-plate capacitor. A voltage, known as an actuation voltage, is applied between the beam and an actuation electrode, the other plate, on the switch base. In the switch-closing phase, or ON-state, for a normally open switch, an actuation on voltage exerts an electrostatic force of attraction on the beam large enough to overcome the stiffness of the beam. As a result of the electrostatic force of attraction, the beam deflects and makes a connection with a contact electrode on the switch base, closing the switch. When the actuation on voltage is removed, the beam will return to its natural state, breaking its connection with the contact electrode and opening the switch. A basic micro electromechanical switch is a single pole single throw switch. The beam's change from open to close or from closed to open is inherently unstable and only controllable up to a certain point. For example, when closing, the beam deforms gradually and predictably, up to a certain point, as a function of the actuation voltage being applied to the switch. Beyond that point, control is lost and the beam's operation becomes unstable causing the beam to flick down towards the actuation electrode. This behaviour is electrically suitable for simple on/off operation but is usually undesirable if there is a desire to avoid the uncontrollable flick towards the actuation electrode, i.e to control the beam's movement, and there is therefore room for improvement of micro electromechanical switches.

SUMMARY

An object of the invention is to define a manner to control the movement of a beam of a micro electromechanical switch.

Another object of the invention is to define a micro electromechanical switch comprising a beam that is predictably controllable.

A further object of the invention is to define a micro electromechanical continuously variable capacitance.

A still further object of the invention is to define a micro electromechanical power sensor.

Still another object of the invention is to define a micro electromechanical switch with a continuously controllable beam.

Still a further object of the invention is to define a reliable electromechanical switch.

The aforementioned objects are achieved according to the invention by a micro electromechanical switch structure with a continuously controllable beam. The beam is continuously controllable by adding an actuation electrode proximate to, but outside a beam projection. The beam projection is onto and perpendicular to a plane of the actuation electrode. By placing an actuation electrode beside a beam instead of underneath the beam, the actuation electrode can continuously control the movement of the beam from a rest position to a complete actuation.

The aforementioned objects are also achieved according to the invention by a micro electromechanical switching structure comprising a first switching support and a switching beam having a first end and a second end, the first end of the switching beam being supported by the first switching support. According to the invention the micro electromechanical switching structure further comprises a first displaced actuation electrode, spaced apart from a projection of the switching beam, the projection being onto a same plane as the first displaced actuation electrode. This enables a continuous control of the beam gap by applying a continuously variable actuation voltage on the displaced actuation electrode.

The first displaced actuation electrode can in some embodiments be arranged at least partly at the second end of the switching beam. In other embodiments the first displaced actuation electrode can suitably be arranged at least partly parallel to a longitudinal axis of the switching beam. The micro electromechanical switching structure can the suitably further comprise a second displaced actuation electrode arranged substantially in the same plane as the first actuation electrode, spaced apart from the projection of the switching beam, at least in part parallel to a logitudinal axis of the switching beam, and spaced apart from the first actuation electrode by the projection of the switching beam. In some embodiments the micro electromechanical switching structure further comprises a second switching support, the second end of the switching beam being supported by the second switching support, i.e. it is of a bridge type. In other embodiments it can suitably be of a cantilever type.

The micro electromechanical switching structure can suitably further comprise a signal electrode arranged to at least partly coincide with the projection of the switching beam, and/or an actuation electrode arranged to at least partly coincide with the projection of the switching beam, and/or a first capacitor plate arranged on the switching beam of the micro electromechanical switching structure and a second capacitor plate arranged on the base of the micro electromechanical switching structure facing the first capacitor plate.

The aforementioned objects are also achieved according to the invention by a continuously variable capacitor comprising a first connection and a second connection, where the variable capacitor comprises a micro electromechanical switching structure according to any above described embodiment comprising a first and a second capacitor plate and where the first connection is connected to the first capacitor plate and the second connection is connected to the second capacitor plate. In some applications switching beam of the controllable variable capacitor can be offset by biasing the first and/or the second displaced actuation electrode.

The aforementioned objects are also achieved according to the invention by a controllable variable capacitor where the capacitance is controlled by a control voltage. The controllable variable capacitor comprises a continuously variable capacitor according to any above described variable capacitor embodiment where the control voltage is connected to the first and or the second displaced actuation electrode.

The aforementioned objects are also achieved according to the invention by a micro electromechanical switching structure beam measurement device comprising a beam measurement element, included in for example a Wheatstone bridge. The measurement device comprises a first continuously variable capacitor according to any above described embodiment as the beam measurement element, and where a measured beam is the switching beam. The device can in some applications further comprise a second continuously variable capacitor according to any above described embodiment as a reference element of the Wheatstone bridge for the beam measurement element.

The aforementioned objects are also achieved according to the invention by a power measurement unit which measures power flowing through a power signal electrode. The power measurement unit comprises a micro electromechanical switching structure beam measurement device according to any above described embodiment, where the power signal electrode is at least partly arranged under the beam that the micro electromechanical switching structure beam measurement device measures.

By providing a micro electromechanical switching circuit according to the invention a plurality of advantages over prior art micro electromechanical switching circuits are obtained. A primary purpose of the invention is to provide a means to be able to continuously control the beam gap of a micro electromechanical switch element. This is achieved by providing a displaced actuation electrode which is not in any part underneath the beam of a micro electromechanical switch in question. By varying the distance of the displaced actuation electrode from the beam, different control characteristics of the beam gap to displaced actuation electrode voltage can be attained. This will extend the use of micro electromechanical switch elements to analog control and measurement devices such as continuoulsy variable capacitors, both as measurement devices and as a controllable capacitor. The invention is easy to implement and does not need any special manufacturing concerns.

Other advantages of this invention will become apparent from the detailed description.

BRIEF DESCRIPTION OF THE DRAWINGS

The invention will now be described in more detail for explanatory, and in no sense limiting, purposes, with reference to the following figures, in which.

DETAILED DESCRIPTION

In order to clarify the method and device according to the invention, some examples of its use will now be described in connection with FIGS. 1A to 10.

Figure 1A:
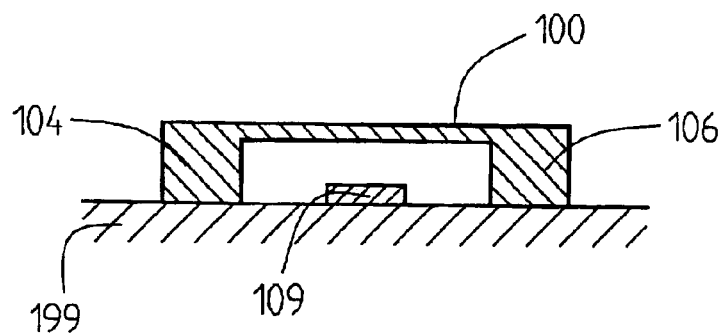
FIGS. 1A–1B shows a bridge type micro electromechanical switch.
Figure 1B:
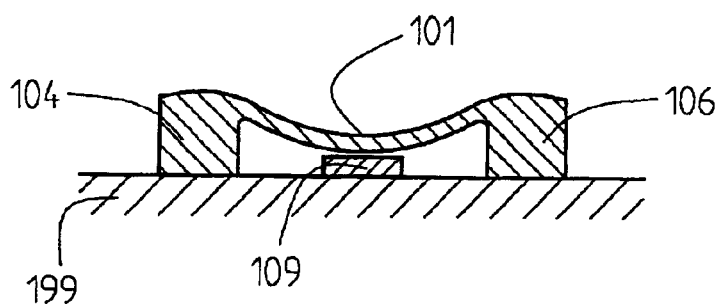

FIGS. 1A and 1B show a bridge type micro electromechanical system (MEMS) switch comprising a beam 100 supported two supports 104, 106. A MEMS switch can be manufactured to look somewhat as illustrated in FIGS. 1A and 1B, with the supports 104, 106 being on top of a substrate 199, i.e. protruding from the substrate 199, in which case the substrate 199 coincides with a base of the switch. Additionally a MEMS switch can be manufactured by creating a depression in the substrate under a beam, which is then supported at one or both ends by the surrounding substrate. The base of the switch will in these MEMS switches not coincide with the substrate, but be located at the bottom of the depression under the beam.

The actuation electrode 109 in a MEMS switch is sometimes combined with the signal electrode, especially when utilized with high frequencies, the commonly used DC voltage as actuation voltage is then easily separated from the signal. A single pole single throw switch can be classified into two basic types, the normally open (NO) and the normally closed (NC). The normally open will not conduct any signal from its input to its output when in its resting state, i.e. when there is no actuation voltage present. The normally open will only conduct a signal from its input to its output when in its active state, i.e. when there is an actuation voltage present. The normally closed will conduct a signal from its input to its output when in its resting state, but not when in its active state. A MEMS switch can accomplish these different types in a number of ways.

A normally open MEMS switch can be accomplished by dividing a signal electrode directly underneath a beam, i.e. creating a gap in the signal electrode, such that a conductive surface underneath the beam is able to overbridge the gap when the MEMS switch is active. When the MEMS switch is inactive the signal path is broken and when the MEMS switch is active the signal path is complete.

A normally closed MEMS switch can be accomplished by having at least a part of the beam that comes into contact with a signal electrode, being conductive to ground. When the MEMS switch is inactive, the signal path is complete and will thus transmit any desired signals. When the MEMS switch is active, the signal electrode will be grounded, thus breaking the signal path.

The actuation electrode 109 possibly combined with a signal electrode is placed underneath the beam 100 on the switch base, which in this type coincides with the substrate 199. When there is no actuation voltage applied to the actuation electrode 109, the beam 100 is in a state of rest as is shown in FIG. 1A. When an actuation voltage is applied between the actuation electrode 109 and the beam 100, a force on the beam 100 will cause it to move in the direction of the force onto the actuation electrode 109, as is shown in FIG. 1B with the bent beam 101.

As was mentioned before, the movement of the beam 100, 101 is not stable, nor in a predetermined relationship to the actuation voltage during the complete bending of the beam 100, 101. Up to a certain flick point, during approximately the first 30% of the total bending, $g_o$, from the state of rest, there is a predictable relationship between the actuation voltage and the amount of bending. When the voltage and thus the resulting bending is beyond the flick point, the beam will uncontrollably flick towards the actuation electrode. This will only give less than approximately 30% of $g_o$ of continuous control of the beam 100. This means that a traditional MEMS switch is only suitable as a switch with two distinct states, on and off.

Figure 2A:
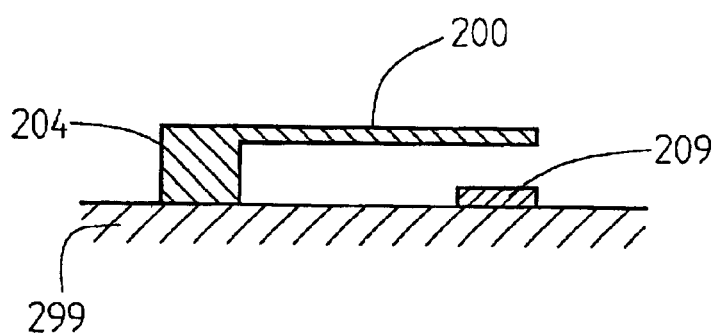
FIGS. 2A–2B shows a cantilever type micro electromechanical switch.
Figure 2B:
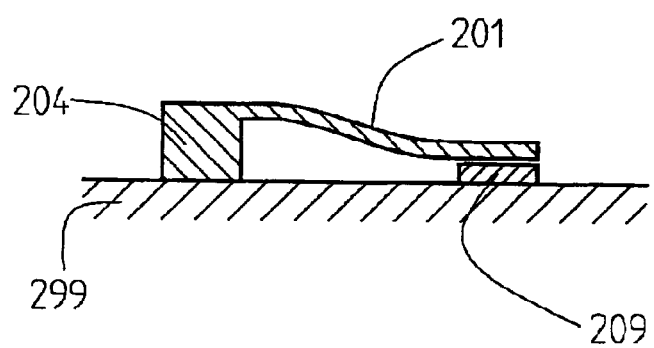

FIG. 2A shows a basic cantilever type MEMS switch built on a substrate 299. The MEMS switch comprises a beam 200 held in place by a single support 204 over an actuation/signal electrode 209. The basic functioning is otherwise the same as that of the basic bridge type MEMS switch described above. The same 30% controlled movement and then a flick onto the actuation electrode, see FIG. 2B, of the beam 201.

Figure 3:
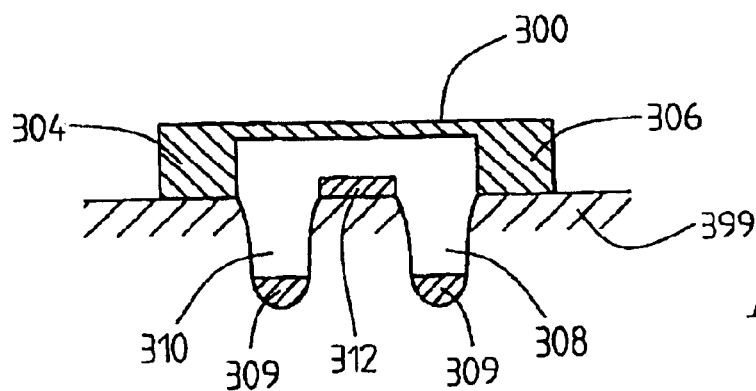
FIG. 3 shows a continuously controllable beam of a bridge type micro electromechanical switch.

There are several ways to solve this problem. In a first example, as shown in FIG. 3, one or two actuation electrodes 309 are put into wells 308, 310 in the substrate 399. A separated signal electrode 312 is approximately two-thirds up from the actuation electrodes 309 in the wells 308, 310, towards the beam 300. The beam 300, supported in this example by two supports 304, 306, can thus be positionally controlled all the way to the signal electrode 312 in relationship to the actuation voltage. A MEMS switch of this type should be very carefully constructed so that the flick point is located below the signal electrode 312, i.e. on the actuation electrode 309 side of the signal electrode 312. The beam's first approximately 30% bending distance towards the actuation electrode 309 is utilized, i.e. the signal electrode 312 will meet the beam 300 before the beam 300 reaches the flick point. A disadvantage of this type of MEMS switch could be argued to be a relatively small controllable bending distance or a very large distance to the actuation electrode, and possibly a certain difficulty to reach high production yields due to difficulties in manufacturing the accurate placement of the signal electrode above the flick point and at the same time as close to the actuation electrode as possible.

Figure 4:
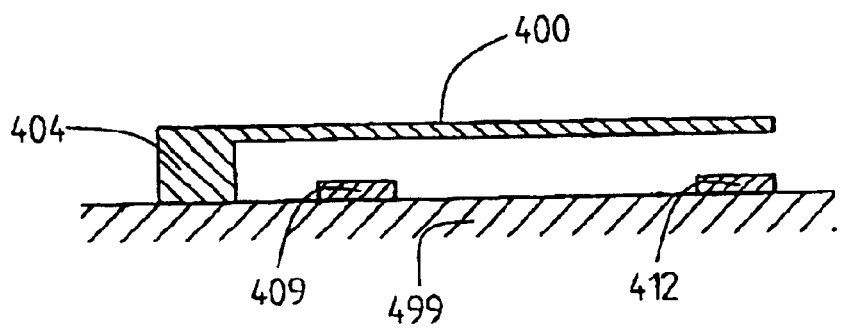
FIG. 4 shows a continuously controllable beam of a cantilever type micro electromechanical switch.

In a second example, as shown in FIG. 4, a cantilever type MEMS switch is used with an elongated beam 400 supported by one support 404. The principle of this MEMS switch, to attain a controllable beam movement, is to separate an actuation electrode 409 and a signal electrode 412 on a substrate 499. The actuation electrode 409 and the signal electrode 412 are separated under the elongated beam 400 such that when the beam 400 reaches the signal electrode 412, then the beam 400 has not yet reached the flick point above the actuation electrode 409. In this example the leverage difference between the signal electrode 412 and the actuation electrode 409 creates a ratio of approximately 3:1, i.e. the switch becomes sensitive to variation in the actuation voltage which "amplifies" a small movement of the beam above the actuation electrode 409 into a much greater movement of the beam above the signal electrode 412. Apart from difficulties with the increased sensitivity of the actuation voltage, the elongated beam will most probably present immense manufacturing difficulties.

To further improve micro electromechanical switches and to further increase the area of use of micro electromechanical switches a new method of controlling bending of beams of micro electromechanical switches has been invented. According to the invention at least one actuation electrode, to be referred to as a displaced actuation electrode, is added to a micro electromechanical switch structure outside but proximate to a projection of the beam, instead of or in addition to an ordinary actuation electrode underneath the beam in question, i.e. within the projection. The projection is a representation of the beam in question onto a same plane as the displaced actuation electrode. The projection could be said to be a perpendicular movement in relation to a plane of the beam in a rest position, of the beam onto a plane of the displaced actuation electrode. The placement of a displaced actuation electrode is never touched by a beam in question, even however much the beam is actuated, i.e. the beam does not bend towards the actuation electrode, at least not to such a degree that when the beam hits the plane of the displaced actuation electrode, the beam hits the displaced actuation electrode. As mentioned, a displaced actuation electrode can either replace or be a complement to a traditional actuation electrode. The traditional actuation electrode can provide a micro electromechanical switch with reliable on/off functionality, and/or be a complement to a displaced actuation electrode to properly force the beam onto a signal electrode to provide a reliable contact between beam and signal electrode.

A micro electromechanical switch structure according to the invention can suitably be provided with capacitor plates/electrodes, one on or integrated with the beam and one suitably on a same plane as a displaced actuation electrode. This will provide the micro electromechanical switch structure with a continuously variable capacitance controllable by the displaced actuation electrode. The displaced actuation electrode can also provide a bias, moving the beam into a position where a small variation of a signal to be measured will result in a large movement of the beam, which movement is suitably measured with the capacitor electrodes.

Figure 5:
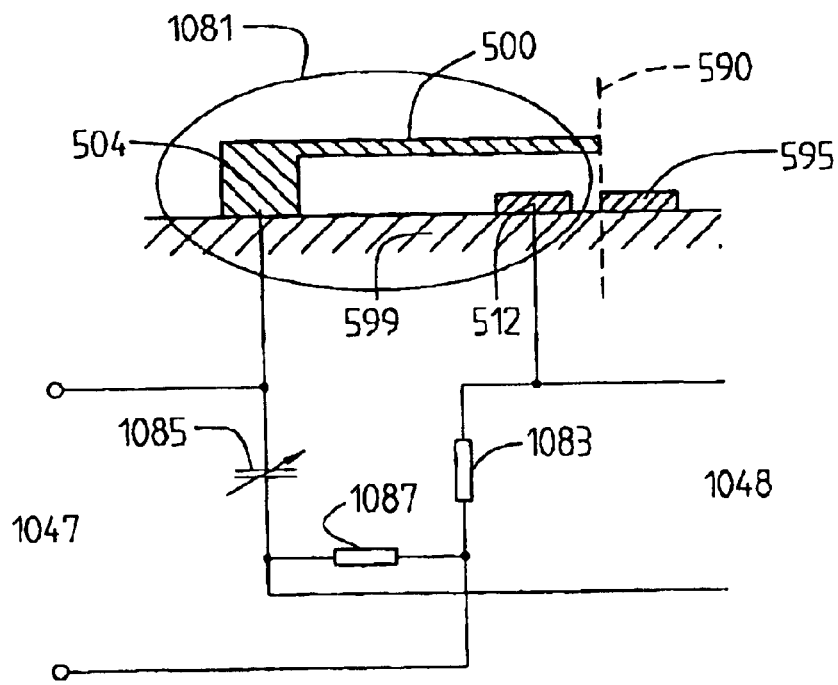
FIG. 5 shows a first embodiment of a micro electromechanical switch structure according to the invention.

FIG. 5 shows a first embodiment of a micro electromechanical switch structure according to the invention. The micro electromechanical switch according to the first embodiment is built on a substrate/switch base 599 and comprises a cantilever beam 500 with a corresponding beam support 504, a displaced actuation electrode 595 arranged at an extension of the beam 500 beyond a line 590 of an edge of the beam 500. The micro electromechanical switch can suitably also comprise a signal electrode 512 underneath the beam 500. The line 590 is perpendicular to a plane of the beam 500 and on the edge of the beam 500, a projection of the beam 500 onto a plane of the displaced actuation electrode 595 will thus not cross the line 590. Nor will a displaced actuation electrode according to the invention cross the line 590, i.e. the projection will be on one side of the line 590 and the displaced actuation electrode will be on the other side of the line 590. The displaced actuation electrode according to this first embodiment can either be in a direct extension of the beam, or, as is shown in FIG. 5, perpendicular to the extension of the beam.

Figure 6:
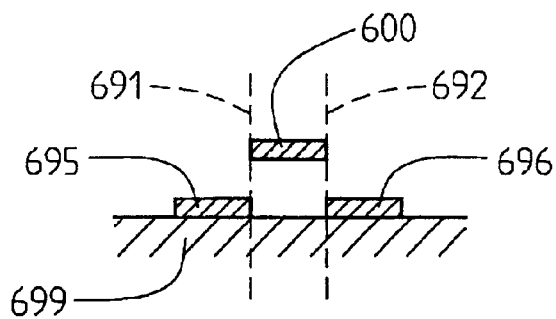
FIG. 6 shows a second embodiment of a micro electromechanical switch structure according to the invention.

FIG. 6 shows a second embodiment of a micro electromechanical switch structure according to the invention. FIG. 6 is a view in the extension of a beam 600 of a micro electromechanical switch built on a substrate/switch base 699. The second embodiment comprises either only one displaced actuation electrode, for example a first displaced actuation electrode 695, or two displaced actuation electrodes, for example also a second displaced actuation electrode 696. According to this second embodiment the one or two actuation electrodes 695, 696, are parallel to an extension of the beam each arranged beyond a respective first line 691 of an edge of the beam 600 and a respective second line 692 of an edge of the beam 600.

Figure 7:
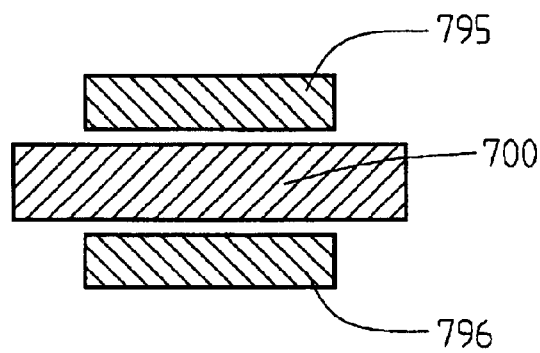
FIG. 7 shows a top view of for example the micro electromechanical switch of FIG. 6.

FIG. 7 shows a top view of for example the micro electromechanical switch of FIG. 6 with a beam 700, a first displaced actuation electrode 795, and a second displaced actuation electrode 796.

Figure 8:
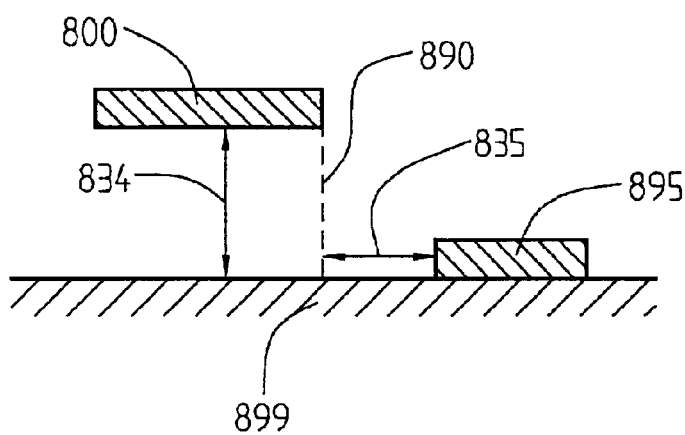
FIG. 8 shows a detail of a micro electromechanical switch structure according to the invention.

FIG. 8 shows a detail of a micro electromechanical switch structure according to the invention built on a substrate 899. A displaced actuation electrode 895 is laterally displaced 835 from a line 890 defining an edge of a projection of a beam 800. The beam 800 has a rest state distance, a beam gap, $g_o$ 834. The amount that the beam will bend depends on a spring constant of the beam 800, a dielectric constant of the gap between the beam 800 and the displaced actuation electrode 895, an effective area, and a voltage between the beam 800 and the displaced actuation electrode 895. In turn the effective area depends on the geometry of the beam 800, the geometry of the displaced actuation electrode 895, and a spatial relationship between the beam 800 and the displaced actuation electrode 895, which in turn in most cases will provide the only usable variable, the lateral displacement 835.

Figure 9:
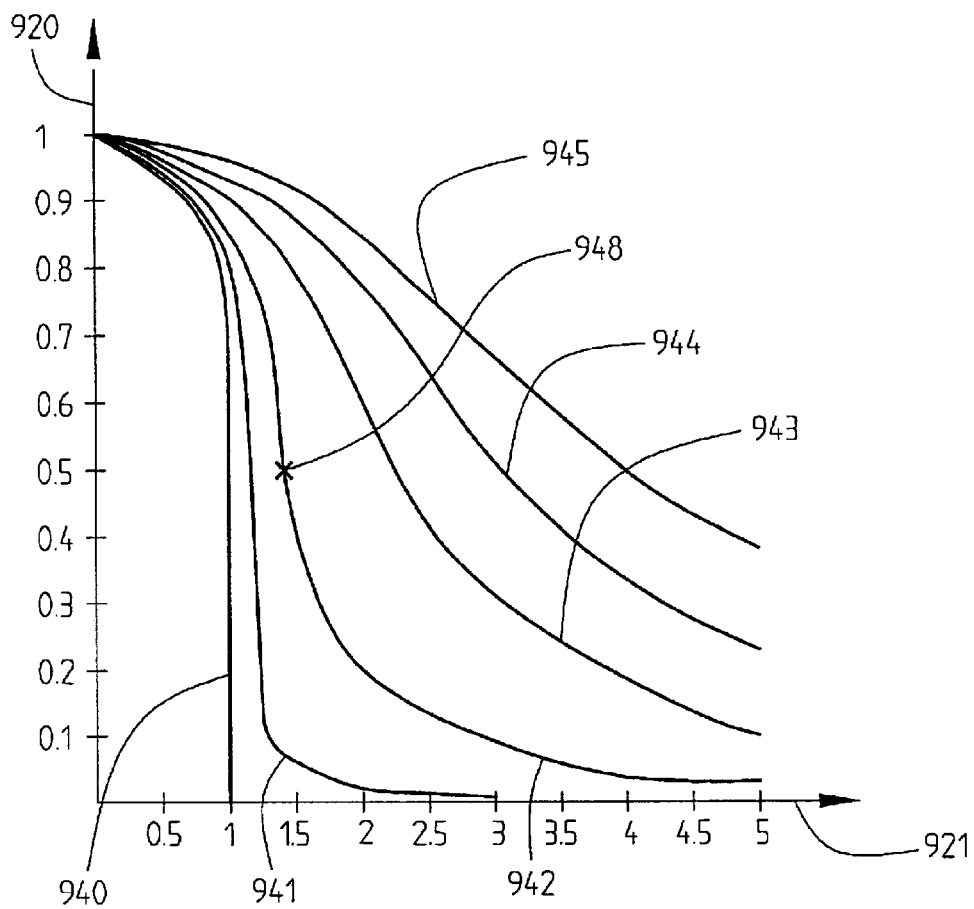
FIG. 9 shows beam position in relation to actuation voltage for a number of different actuation electrode configurations according to the invention.

FIG. 9 shows a beam position/bending in relation to an actuation voltage for a number of different actuation electrode configurations according to the invention. The diagram shows a beam gap g factor scale 920 in relation to an actuation electrode voltage factor scale 921 for a number of, for example, different lateral displacements of a displaced actuation electrode. A first voltage to gap curve 940 of a first lateral displacement which is approximately a 0% effective displacement of the maximum beam gap $g_o$. The effective displacement will be in some sort of dependency on the displacement of the displaced actuation electrode, but is perhaps better also related to the effective area, see above. A second voltage to gap curve 941 of a second lateral displacement which is approximately a 25% effective displacement of the maximum beam gap $g_o$. A third voltage to gap curve 942 of a third lateral displacement which is approximately a 50% effective displacement of the maximum beam gap $g_o$. A fourth voltage to gap curve 943 of a fourth lateral displacement which is approximately a 75% effective displacement of the maximum beam gap $g_o$. A fifth voltage to gap curve 944 of a fifth lateral displacement which is approximately a 100% effective displacement of the maximum beam gap $g_o$. A sixth voltage to gap curve 945 of a sixth lateral displacement which is approximately a 125% effective displacement of the maximum beam gap $g_o$. As can be seen, the further displaced the displaced actuation electrode is, i.e the smaller the relative effective area becomes, the larger actuation voltage is necessary for the same bending of the beam. At the same time the relationship between actuation voltage squared and beam gap can be described with a linear equation, i.e. a line with a constant slope.

As mentioned before, a MEMS switch according to the invention is suitable to use as a power sensor. By displacing the displaced actuation electrode such that a actuation voltage to beam position curve has a section which is very steep, such as the third voltage to gap curve 942, then the displace actuation electrode or electrodes can be biased such that the beam attains a suitable operating/working point 948 in or near the middle of the steep section of the curve. A power sensor will then attain a very high sensitivity and a relatively large measurement range. The measurements are made by measuring the beam's position, or rather the beam's positional deviation from the operating point 948. The measurements of the beam's position and/or deviations can suitably be done by adding one capacitor plate to the beam and a corresponding capacitor plate on the switch base, making a variable capacitance that varies with the movement of the beam.

Figure 10:
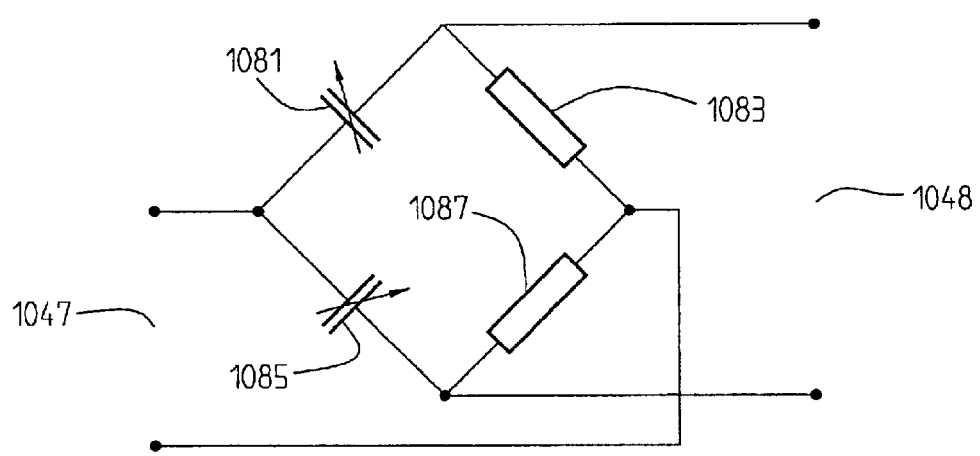
FIG. 10 shows a suitable wheatstone bridge arrangement for a power sensor according to the invention.

FIG. 10 shows a suitable Wheatstone bridge arrangement when using a beam coupled variable capacitance in for example a power sensor according to the invention.

The Wheatstone bridge comprising a power feed 1047 of the Wheatstone bridge, a signal exit 1048 giving a beam positional value, a beam gap/positional measurement element 1081, a beam gap measurement reference 1085, and a further two bridge elements, a first bridge element 1083, and a second bridge element 1087. The beam gap measurement reference element 1085 is suitably of a same type as the beam gap/positional measurement element 1081 but arranged on a similar but unused MEMS switch. The first bridge element 1083 and the second bridge element 1087 are preferably of the same kind and type. The positional measurement element 1081 suitably comprises a first electrode plate on a beam whose position is to be measured, and a second electrode plate underneath the first plate on the beam thus creating a capacitor whose capacitance will vary with the position of the beam in question.

The basic principle of the invention is to continuously vary the position/bending of a beam of a MEMS switch by means of one or more displaced actuation electrodes. The displaced actuation electrodes are displaced in such a way that they are not underneath a beam in question. The MEMS switch can further comprise a signal electrode underneath the beam, and/or an additional actuation electrode for, for example, on/off operation, and/or a beam positional measurement element such as capacitor plates. A MEMS switch according to the invention can be used in a variety of applications where a continuously variable beam is of an advantage, such as a continuously variable capacitor, a power sensor.

The invention is not restricted to the above described embodiments, but may be varied within the scope of the following claims.

What is claimed is:

1. A micro electromechanical switching structure comprising a first switching support;
   a switching beam contained in a first plane having a first end and a second end, the first end of the switching beam being supported by the first switching support, and,
   a first displaced actuation electrode contained in a second plane separate from the first plane and spaced apart from or adjacent to a projection plane, the projection plane being perpendicular to the first plane and extending from the second end of the switching beam onto the second plane,
   wherein the entire switching beam is located on one side of the projection plane and the entire first displaced actuation electrode is located on the other side of the projection plane.

2. The micro electromechanical switching structure according to claim 1, wherein the first displaced actuation electrode is arranged at least partly parallel to a longitudinal axis of the switching beam.

3. The micro electromechanical switching structure according to claim 2, further comprising:
   a second displaced actuation electrode arranged substantially in the second plane and located on entirely the one side of the projection plane.

4. The micro electromechanical switching structure according to claim 2, further comprising:
   a second switching support, the second end of the switching beam being supported by the second switching support.

5. The micro electromechanical switching structure according to claim 1, further comprising:
   a signal electrode located on the one side of the projection plane.

6. The micro electromechanical switching structure according to claim 1, wherein one end of an the first displaced actuation electrode is aligned with the projection plane.

7. The micro electromechanical switching structure according to claim 1, further comprising:

a first capacitor plate arranged on the switching beam, and a second capacitor plate arranged on the base of the micro electromechanical switching structure facing the first capacitor plate.

8. A continuously variable capacitor comprising a first connection and a second connection, wherein the variable capacitor comprises a micro electromechanical switching structure according to claim 7 and where the first connection is connected to the first capacitor plate and the second connection is connected to the second capacitor plate.

9. A continuously variable capacitor according to claim 8, wherein the switching beam of the controllable variable capacitor is offset by biasing the first displaced actuation electrode.

10. A controllable variable capacitor where the capacitance is controlled by a control voltage, wherein the controllable variable capacitor comprises a continuously variable capacitor according to claim 8 where the control voltage is connected to the first displaced actuation electrode.

11. A micro electromechanical switching structure beam measurement device comprising a beam measurement element, wherein the beam measurement element includes a first continuously variable capacitor according to claim 8.

12. The micro electromechanical switching structure beam measurement device according claim 11, further comprising:

a Wheatstone bridge, wherein the beam measuring element is a bridge element in the Wheatstone bridge.

13. The micro electromechanical switching structure beam measurement device according claim 12, further comprising:

a second continuously variable capacitor according to claim 9, wherein a reference element of the Wheatstone bridge corresponds to the second continuously variable capacitor.

14. A power measurement unit for measuring power flowing through a power signal electrode, comprising:

a micro electromechanical switching structure beam measurement device according to claim 11, wherein the power signal electrode is at least partly arranged under the switching beam.

* * * * *